United States Patent
Pathak et al.

(10) Patent No.: US 12,526,204 B2
(45) Date of Patent: Jan. 13, 2026

(54) CHARTING AND MAPPING VISUALIZATION OF TIME AND LOCATION DATA

(71) Applicant: Boost SubscriberCo L.L.C., Englewood, CO (US)

(72) Inventors: Anil Pathak, Englewood, CO (US); Sagar Bhatt, Englewood, CO (US); Charlie Kennamer, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 649 days.

(21) Appl. No.: 17/875,835

(22) Filed: Jul. 28, 2022

(65) Prior Publication Data

US 2024/0039801 A1 Feb. 1, 2024

(51) Int. Cl.
*H04W 24/08* (2009.01)
*H04L 41/22* (2022.01)
*H04L 41/5009* (2022.01)
*H04L 43/0811* (2022.01)

(52) U.S. Cl.
CPC .......... *H04L 41/22* (2013.01); *H04L 41/5009* (2013.01); *H04L 43/0811* (2013.01); *H04W 24/08* (2013.01)

(58) Field of Classification Search
CPC ....... H04W 24/10; H04W 4/38; H04W 24/02; H04W 4/00; H04W 4/021; H04W 4/029; H04W 24/08; H04W 24/04; H04W 76/11; H04W 28/08; H04W 84/00; H04W 8/00; H04W 12/77; H04L 49/205; H04L 1/0023
See application file for complete search history.

(56) References Cited

U.S. PATENT DOCUMENTS

| | | | |
|---|---|---|---|
| 2017/0078171 A1* | 3/2017 | Tapia | H04W 24/08 |
| 2021/0345127 A1* | 11/2021 | Tiwari | H04W 24/02 |
| 2023/0217357 A1* | 7/2023 | Rathore | H04W 48/16 370/329 |

* cited by examiner

*Primary Examiner* — Tu X Nguyen
(74) *Attorney, Agent, or Firm* — Jeremiah J. Baunach; Frontier IP Law PLLC (57) ABSTRACT

Example embodiments are directed towards charting and mapping visualization of time and location data, such as, for example, that including or related to key performance indicator (KPIs) of a wireless telecommunication network. For example, in response to the system electronically receiving from a user an indication of a wireless network report type indicating one or more of a logical and a physical portion of a wireless services network, the system may determine a plurality of KPIs based on the indication (e.g., based on a selected report type and selected filter(s)). The system may then cause the plurality of determined KPIs to be displayed on a graphical user interface (GUI), including in interactive charts and maps containing objects which the user may select to drill-down and see more detailed data regarding the selected object based on the indicated report type and filter.

8 Claims, 11 Drawing Sheets

CHARTING AND MAPPING VISUALIZATION OF TIME AND LOCATION DATA

BACKGROUND

As a wireless telecommunication service provider builds and maintains its network (such as a cloud-native 5G wireless telecommunication network), it has multiple interrelated systems whose performance needs to be tracked over various periods of time to identify and resolve problems and increase network performance. It is with respect to these and other considerations that the embodiments described herein have been made.

BRIEF SUMMARY

Key performance indicators (KPIs) for wireless telecommunication networks are performance metrics and operation characteristics of the wireless telecommunication network that may be used to identify and resolve problems and increase network performance. Briefly described, embodiments disclosed herein are directed to charting and mapping visualization of time and location data, such as, for example, that including or related to KPIs of a wireless telecommunication network.

For example, a method involving a KPI user interface for a wireless services network may include electronically receiving an indication of a wireless network report type indicating one or more of a logical portion and a physical portion of the wireless services network. In response to electronically receiving the indication, the system may determine a plurality of KPIs based on the indication (e.g., based on a selected report type and selected filter(s)). The system may then cause the plurality of determined KPIs to be displayed on a graphical user interface (GUI), including in interactive charts and maps containing objects which the user may select to drill-down and see more detailed data regarding the selected object based on the indicated report type and filter.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
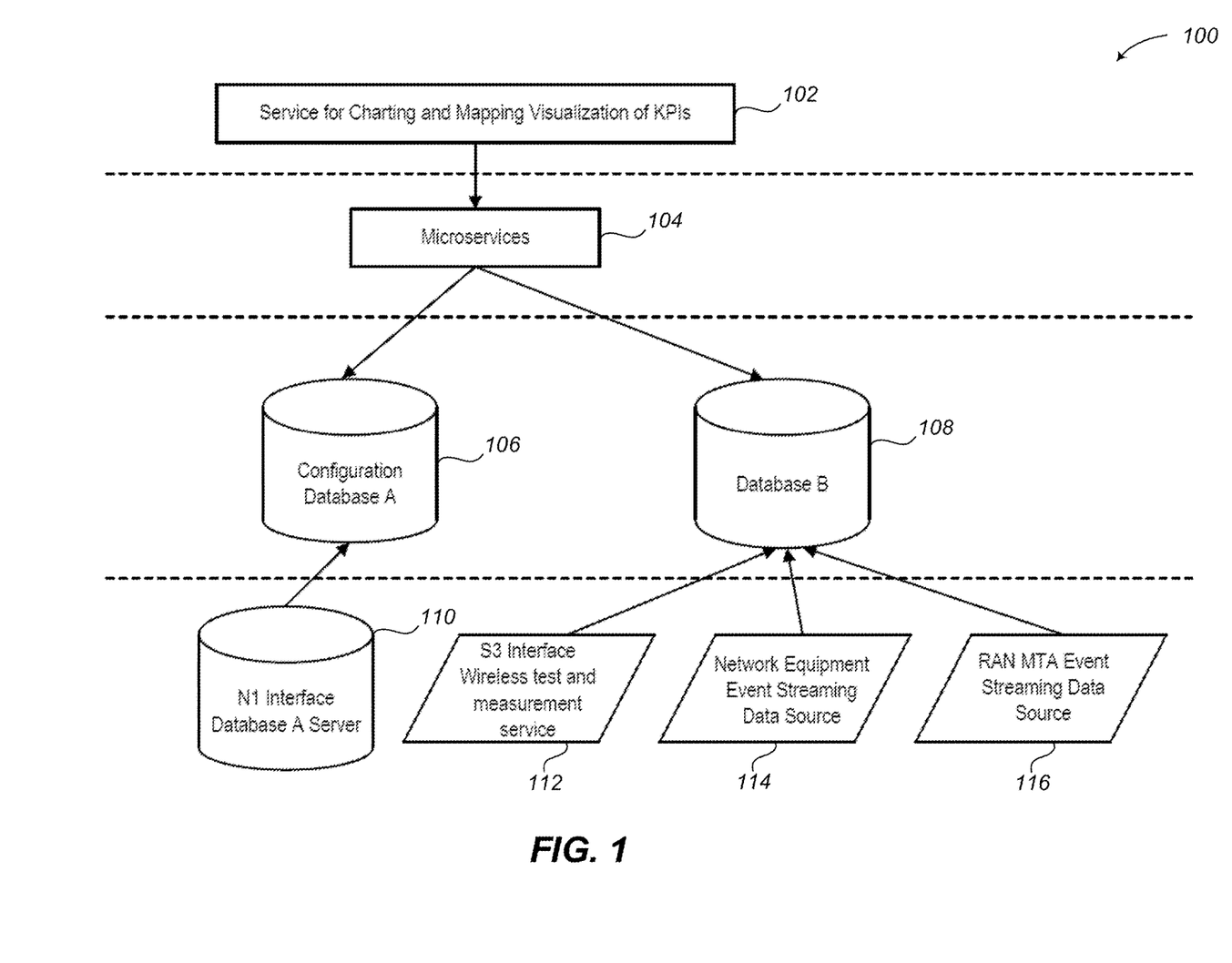
FIG. 1 illustrates a diagram of an example underlying system for charting and mapping visualization of time and location data for a wireless telecommunication network in accordance with embodiments described herein.

FIG. 1 illustrates a diagram of an example underlying system 100 for charting and mapping visualization of time and location data for a wireless telecommunication network in accordance with embodiments described herein.

Embodiments disclosed herein are directed to charting and mapping visualization of time and location data, such as, for example, that including or related to KPIs of a wireless telecommunication network. However, the embodiments herein may be used to chart and map visualization of other types of time and/or location data. KPIs for wireless telecommunication networks are performance metrics and operation characteristics of the wireless telecommunication network that may be used to identify and resolve problems and increase network performance. In various embodiments, KPIs may be used for the following tasks: to monitor and optimize the radio network performance in order to provide better subscriber quality or to achieve better use of installed network resources; to detect unacceptable performance related issues in the cellular network immediately (which will enable the operator to take rapid actions in order to preserve the quality of the existing network services); and to provide radio frequency planners with the detailed information (which will help them configure the network parameters for optimum use).

KPIs may be categorized into following subcategories: accessibility; retainability; integrity; availability and mobility. Fifth generation (5G) wireless network KPIs may support the data rate, devices and latency for enhanced capabilities of 5G. For example, 5G KPIs may include, but are not limited to, indicators for or measurements of: peak data rate; user experience data rate; connection density; reliability; battery life; position accuracy; latency; security and availability. 5G KPIs may be further grouped into the following categories: eMBB (Enhanced mobile broadband); URLLC (Ultra-reliable and low-latency communications); and mMTC (Massive machine type communications). The table below provides some example KPIs and example minimum requirements for 5G wireless networks in various embodiments:

| Example 5G performance requirement type | Example Minimum KPI requirement | Example Category |
| --- | --- | --- |
| Peak Data Rate | Downlink: 20 Gbps<br>Uplink: 10 Gbps | eMBB |
| Peak Spectral Efficiency | Downlink: 30 bits/sec/Hz<br>Uplink: 15 bits/sec/Hz | eMBB |
| Data rate experienced by User | Downlink: 100 Mbps<br>Uplink: 50 Mbps | eMBB |
| Area Traffic Capacity | Downlink: 10 Mbits/sec/m$^2$ in indoor hotspot (eMBB test environment) | eMBB |
| Latency (User Plane) | 4 ms for eMBB<br>1 ms for URLLC | eMBB, URLLC |
| Latency (User Plane) | 20 ms (10 ms encouraged) | eMBB, URLLC |
| Connection Density | 1 × 10$^6$ devices/Km$^2$ | mMTC |
| Average Spectral Efficiency | (All the below figures are in units of bits/sec/Hz/TRxP)<br>Indoor hotspot: DL: 9/UL: 6.75<br>Dense Urban: DL: 7.8/UL: 5.4<br>Rural: DL: 3.3/UL: 1.6 | eMBB |
| Energy Efficiency | Efficient data transmission (Loaded case): To be demonstrated by "average spectral efficiency:.<br>Low energy consumption (no data case): This test case should support high sleep ratio/long sleep duration. | eMBB |
| Reliability | 1 × 10$^{-5}$ probability of transmitting layer-2 PDU of 32 bytes in size within 1 ms (in channel quality of coverage edge for Urban Macro-URLLC test environment.) | URLLC |
| Mobility | Dense Urban: up to 30 Km/h<br>Rural: up to 500 Km/h | eMBB |
| Mobility Interruption Time | 0 ms | eMBB, URLLC |
| Bandwidth (Maximum Aggregated System) | At least 100 MHz<br>Up to 1 GHz for operation in high frequency bands i.e. above 6 GHz | IMT-2020 |

The service for charting and mapping visualization of KPIs 102 shown in FIG. 1 that provides the graphical user interfaces (GUI) for such visualization receives KPI data from various subsystems of the wireless network via various corresponding microservices 104. For example, such microservices may be Restful microservices created using PHP: Hypertext Preprocessor (PHP), an open source scripting language in which scripts are executed on a server. However other languages and implementation tools may also or instead be used.

The example system architecture shown in FIG. 1 splits application functions from network data. In particular, the system configuration represented by Database A 106 (e.g., implemented using MySQL), which is connected to the Database A server 110 (e.g., an SQL server) and operates via the 5G N1 interface used to transfer user equipment (UE) information (related to connection, mobility and sessions) to the Access & Mobility Management Function (AMF), is separate from Database B 108, which collects and stores network event data from various sources. For example, Database B 108 may be implemented using Apache Druid™, which is a column-oriented, open-source, distributed data store written in Java™ and designed to quickly ingest massive quantities of event data, and provide low-latency queries on top of the data. In an example embodiment, database B 108 may ingest data from a wireless network test and measurement service 112 via an S3 interface, such as from Accuver™, which is a 5G wireless test and measurement service that optimizes the performance and reliability of mobile networks. Database B 108 may also ingest data from network equipment (e.g., Cisco® network equipment) via an event streaming data source 114, such as via Apache Kafka™. Apache Kafka™ provides a unified, high-throughput, low-latency platform for handling real-time data feeds. Database B 108 may also ingest data from a cloud native radio access network (RAN) event streaming data source 116, such as from Mavenir™, also via Apache Kafka™. Mavenir™ provides a cloud-native RAN Intelligent Controller (RIC) that integrates and interacts with open application programming interfaces (APIs) to enable a multi-vendor ecosystem that offers intelligence, insights, and network control in the wireless network.

Figure 2:
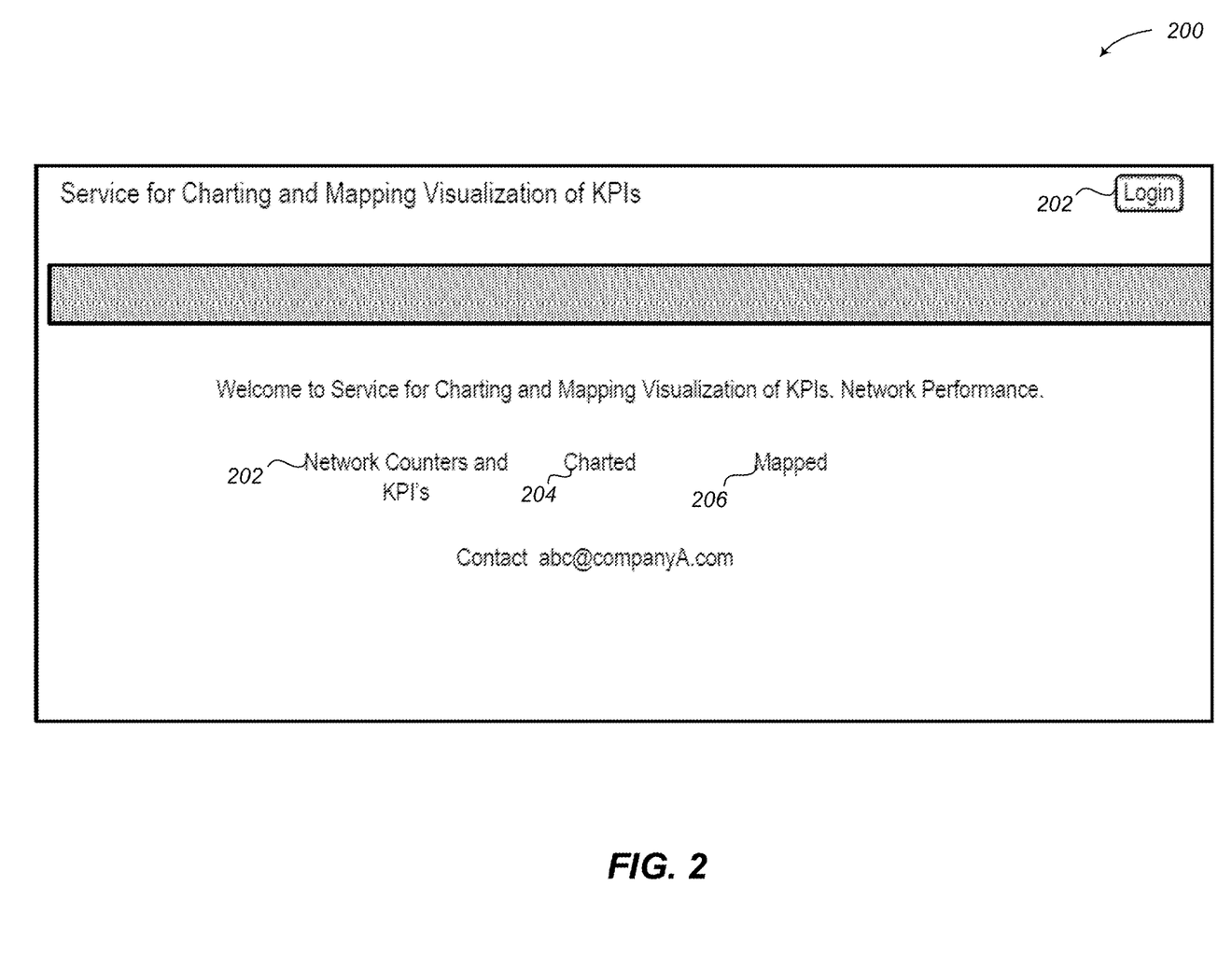
FIG. 2 is a diagram of example graphical user interface (GUI) of a login screen for a service for charting and mapping visualization of KPIs of a wireless telecommunication network in accordance with an embodiment described herein.

FIG. 2 is a diagram of example graphical user interface (GUI) of a login screen 200 for a service for charting and mapping visualization of KPIs of a wireless telecommunication network in accordance with an embodiment described herein.

For example, the login screen 200 may be generated by the service for charting and mapping visualization of KPIs 102 of FIG. 1. Shown are a plurality of selectable user interface elements including a "network counters and KPIs" selectable user interface element 202, a "charted" selectable user interface element 204 and a "mapped" selectable user interface element 202. In an example embodiment, selection of the "network counters and KPIs" selectable user interface element 202 may cause a GUI screen to appear that displays various network counters and KPIs for a particular wireless network. Selection of the "charted" selectable user interface element 204 may cause a GUI screen to appear that includes a charting screen displaying various example interactive charts based on one or more of a plurality of KPIs for the particular wireless network. Selection of the a "mapped" selectable user interface element 206 may cause a GUI screen to appear that includes a mapping screen displaying an example geographical map of network elements based on one or more of a plurality of KPIs for the particular wireless network. A login button 202 may also be displayed that, when selected, enables a user to log in to the system to access additional or other customized features and saved searches or reports regarding the plurality of KPIs for the particular wireless network. In some embodiment, the user must log in to the system using the login button 202 in order to access the GUI screens provided by the "network counters and KPIs" selectable user interface element 202, the "charted" selectable user interface element 204 and/or the "mapped" selectable user interface element 202.

Figure 3:
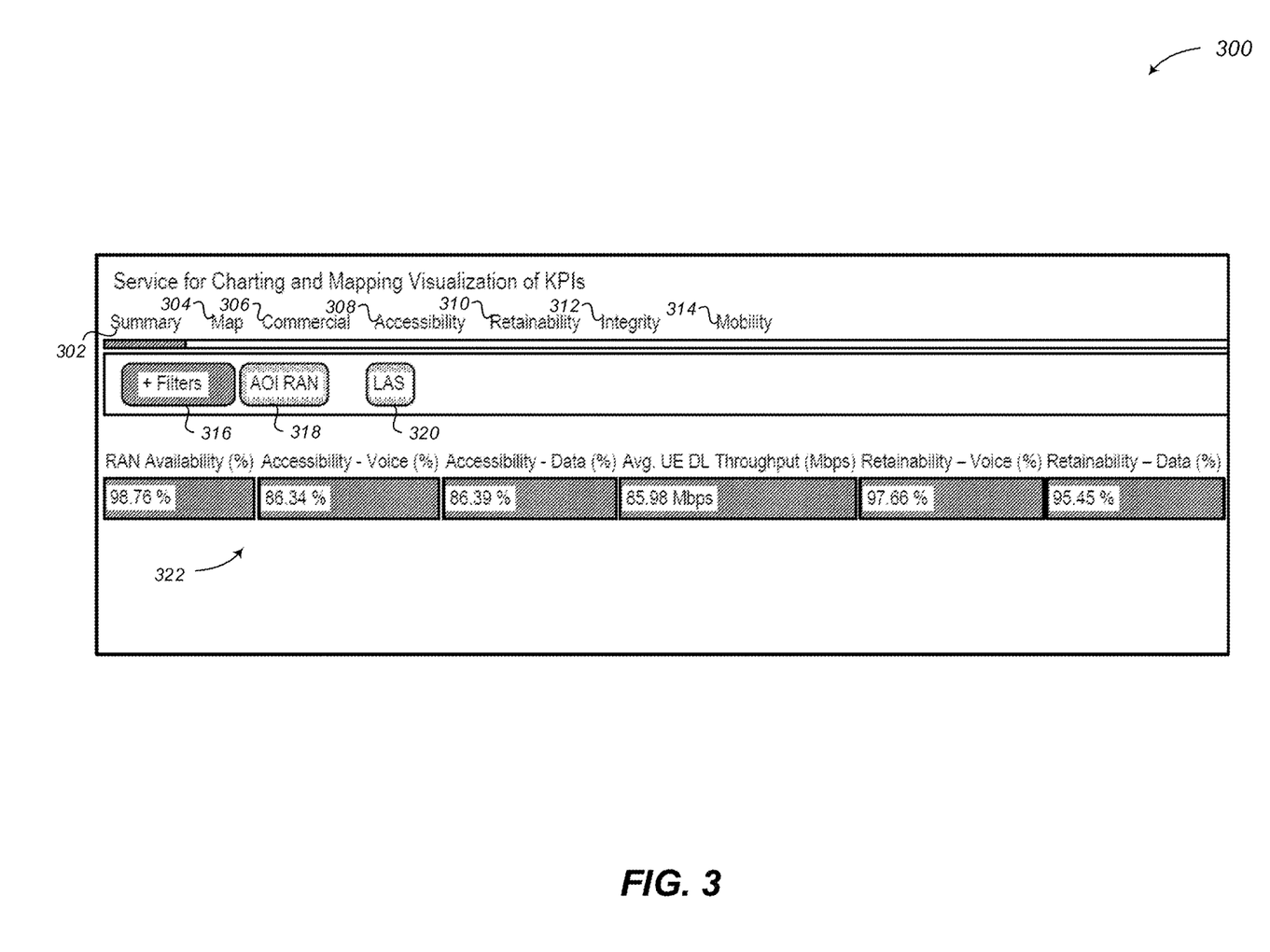
FIG. 3 is a diagram of an example GUI of a summary screen for a service for charting and mapping visualization of KPIs of a wireless telecommunication network based on a user selecting a custom report in accordance with an embodiment described herein.

FIG. 3 is a diagram of an example GUI of a summary screen 300 of a service for charting and mapping visualization of KPIs of a wireless telecommunication network based on a user selecting a custom report in accordance with an embodiment described herein.

Displayed on the summary screen 300 are interactive menu options for displaying different views of KPI data for the wireless network. In the example embodiment shown, displayed is a selectable summary option 302 for viewing the summary of KPIs 322 based on a user selecting a custom report. The user may select a type of report (e.g. Area of Interest (AOI) RAN) and various other filters using the filters selectable user interface element 316 to show applicable KPIs for selected logical and/or physical portions of the wireless services network. In the example shown in FIG. 3, the user has selected the Area of Interest (AOI) RAN report shown by the AOI RAN indicator 318 and a filter indicating a particular market, Las Vegas (LAS), shown by the LAS indicator 318 designating a particular portion of the wireless services network. Thus, in response, the summary of KPIs 322 displays the applicable KPIs in the AOI RAN report for the LAS market. In the example embodiment, these KPIs include the RAN availability percentage, the voice accessibility percentage, the data accessibility percentage, the average UE downlink (DL) throughput in Mbps, the voice retainability percentage, and the data retainability percentage for the AOI RAN report in the LAS market.

In some embodiments, the display of the KPIs may be highlighted, colored, bolded or otherwise differently formatted conditionally based on the performance indicated by one or more of the displayed KPIs. For example, a different color displayed in association with each KPI may indicate a different performance level indicated by the displayed KPI value.

Figure 4A:
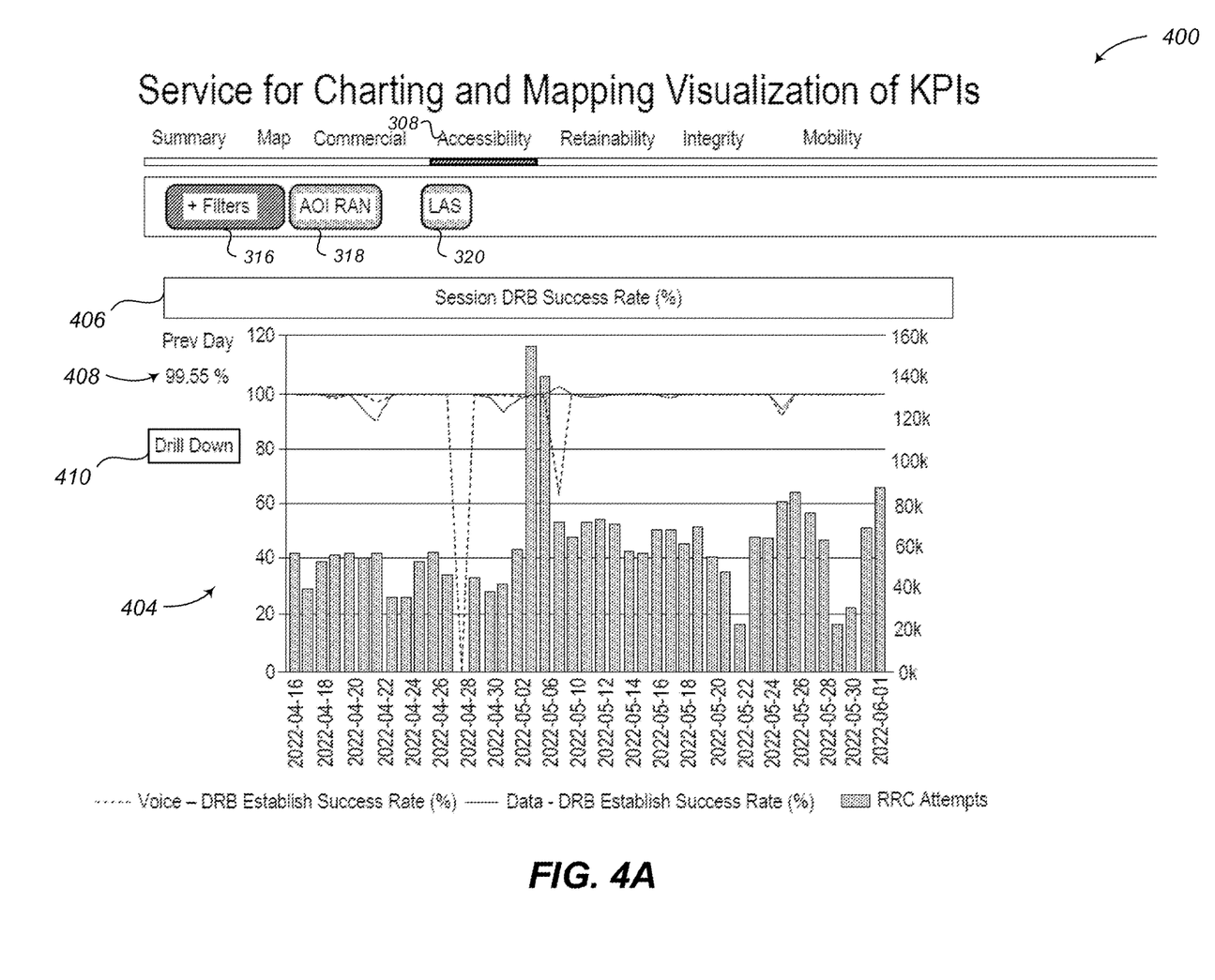
FIGS. 4A through 4C are portions of an example GUI of a charting screen displaying various example interactive charts based on one or more of a plurality of KPIs in response to a user selecting a custom report in accordance with embodiments described herein.
Figure 4B:
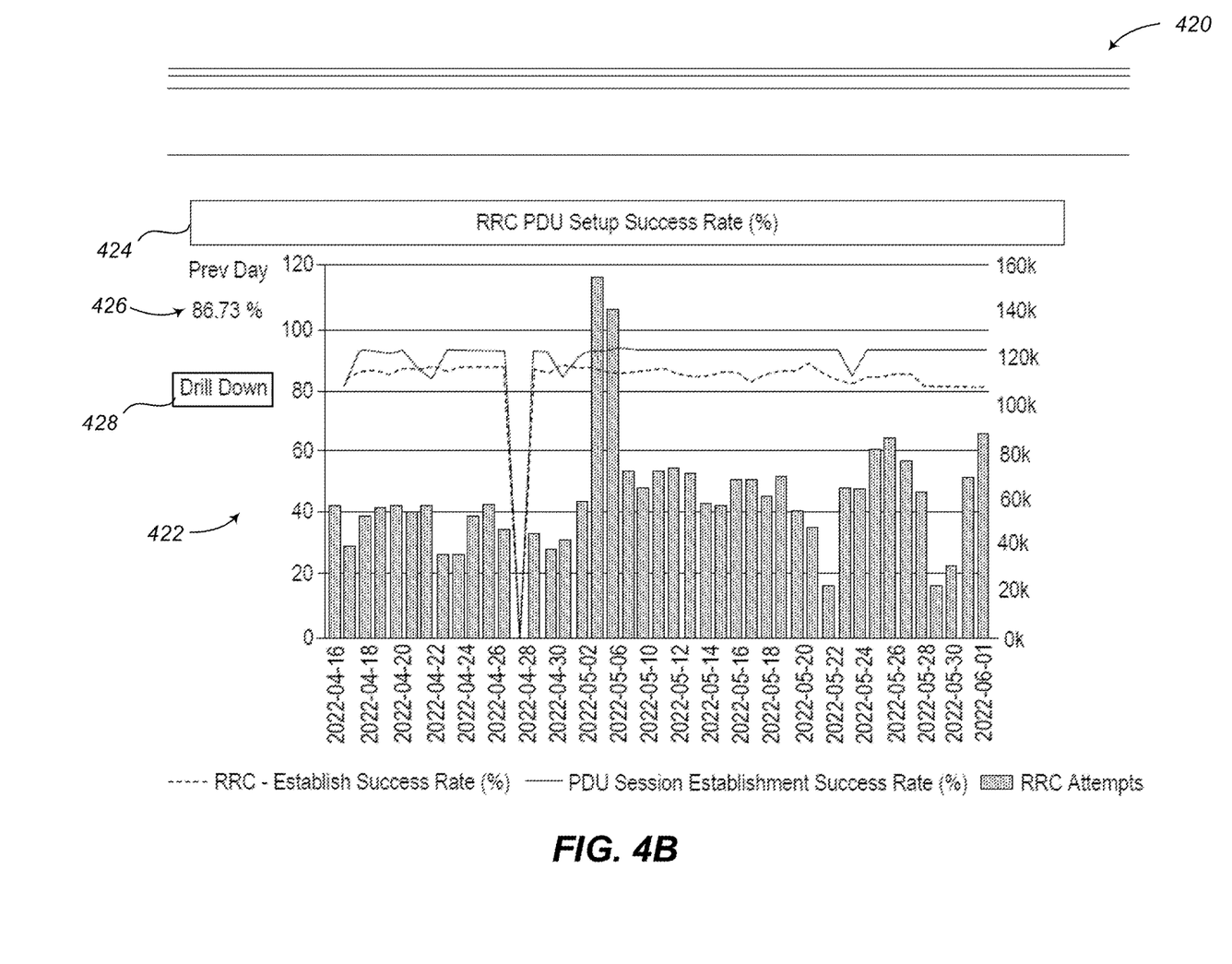
Figure 4C:
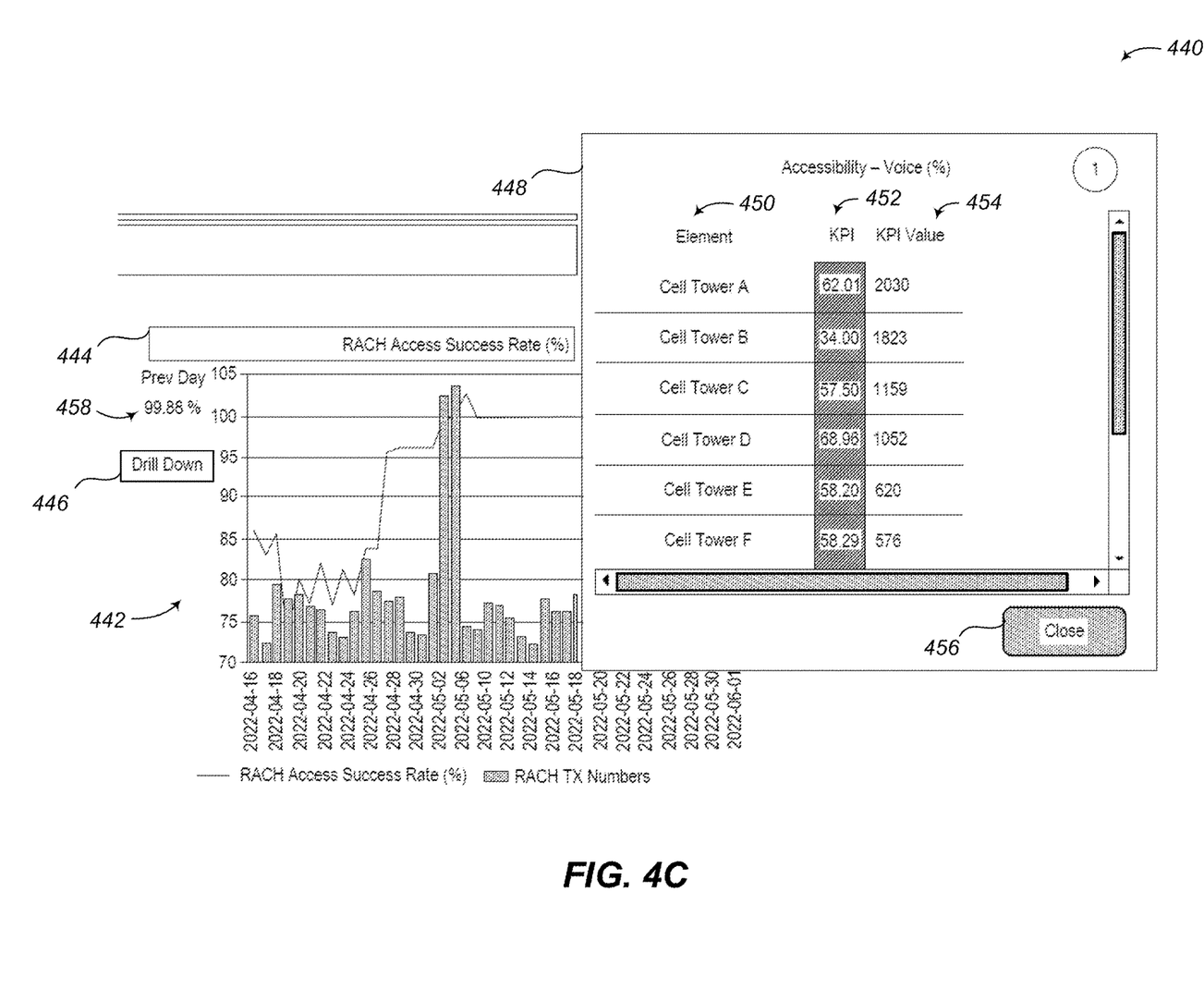
Figure 5:
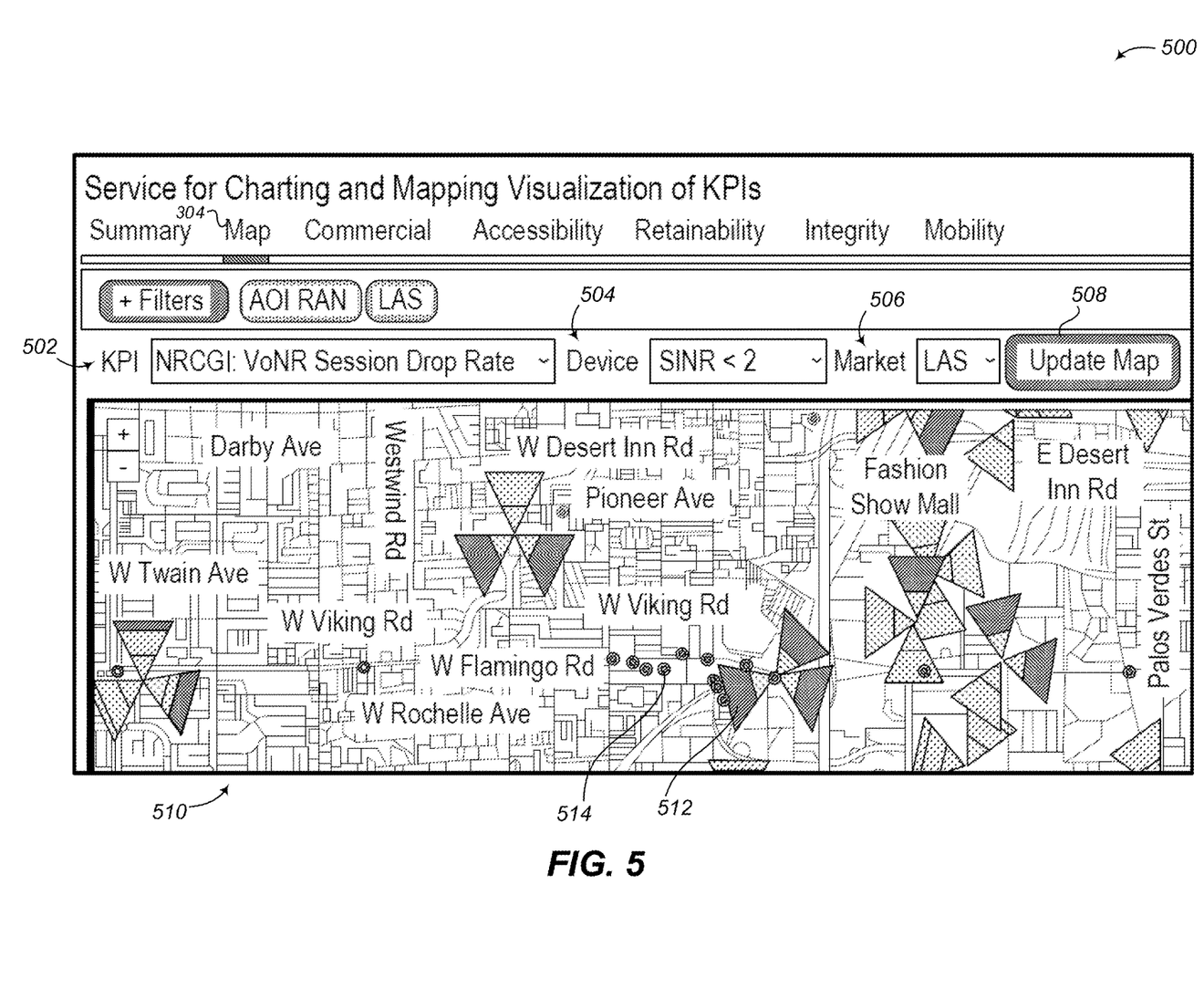
FIG. 5 is an example GUI of a mapping screen displaying an example geographical map of network elements based on one or more of a plurality of KPIs in response to a user selecting a custom report in accordance with embodiments described herein.

Also displayed is a "Map" selectable user interface element 304 that, when selected, causes an interactive geographical map of network elements to be displayed based on one or more of a plurality of KPIs, such as, for example, the map displayed in FIG. 5. Additionally, different selectable user interface elements are displayed for different categories of KPIs, such that in response to a particular user interface element corresponding to a particular category of KPI being selected, various charts may be displayed based on one or more of a plurality of KPIs falling within that particular category. In the example shown in FIG. 3, in response to the "Commercial" selectable user interface element 306 being selected, various charts are displayed based on one or more of a plurality of KPIs falling within the KPI category of "Commercial". In response to the "Accessibility" selectable user interface element 308 being selected, various charts are displayed based on one or more of a plurality of KPIs falling within the KPI category of "Accessibility", such as, for example, the charts shown in FIGS. 4A through 4C. In response to the "Retainability" selectable user interface element 310 being selected, various charts are displayed based on one or more of a plurality of KPIs falling within the KPI category of "Retainability". In response to the "Integrity" selectable user interface element 312 being selected, various charts are displayed based on one or more of a plurality of KPIs falling within the KPI category of "Integrity". In response to the "Mobility" selectable user interface element 314 being selected, various charts are displayed based on one or more of a plurality of KPIs falling within the KPI category of "Mobility".

In an example embodiment, such selectable user interface elements may be persistently displayed and available in a menu when various different KPI data is shown in the portion of the GUI below the menu, such that the user can easily select different report types and filters and navigate between the summary of KPIs 322, the applicable map (shown in FIG. 5) and the applicable various charts (shown in in FIGS. 4A-4C) for different categories of KPIs from any screen or state the GUI is in. Additional or different selectable user interface elements may be provided and displayed in various embodiments for viewing additional or different interactive charts and interactive maps based on additional or different KPIs and categories.

FIGS. 4A through 4C are portions 400, 420 and 440 of an example GUI on a charting screen displaying various example interactive charts 404, 422, 442 based on one or more of a plurality of KPIs in response to a user selecting a custom report in accordance with embodiments described herein. For example, the charts 404, 422, 442 are displayed based on the user selecting the AOI RAN type of report shown by the AOI RAN indicator 318 and a filter indicating a particular market, shown by the LAS indicator 318 designating a particular portion of the wireless services network. Thus, in response to the user have made such selections and then selecting the "Accessibility" selectable user interface element 308, various applicable charts, including the charts 404, 422, 442 and others (not shown) are displayed based on the applicable KPIs in the selected AOI RAN report for the LAS market under the "Accessibility" category.

In an example embodiment, the charts 404, 422, 442 may be displayed on one GUI screen or page such that the user may easily scroll through the various charts for convenient viewing. The headers of the charts may also be conditionally formatted based on performance of the corresponding KPIs on which the charts are based. For example, the system 100 may visually format a corresponding header of each of the charts 404, 422, 442 based on corresponding performance levels of at least one determined KPI over time showing on the chart.

The example session data radio bearer (DRB) establishment success rate chart 404 shown in FIG. 4A is a combined line and bar chart with the lines graphically illustrating the DRB establishment success rate percentage over time for each of voice and data for the selected AOI RAN report for the LAS market. Also shown on the chart 404 are bars graphically illustrating numbers of radio resource control (RRC) attempts on the same chart over the same timeframe. The vertical axis on the right hand side of the chart 404 indicates the number of RRC attempts in the thousands while the vertical axis on the left hand side of the chart 404 indicates the DRB establishment success rate percentage.

The process of displaying such data may include, in response to electronically receiving a selection of the AOI RAN report for the LAS market, the system 100 determining a DRB establishment success rate percentage over time for each of voice and data for AOI RAN report for the LAS market. The system 100 then causes the DRB establishment success rate chart 404 to be displayed. In various embodiments, the display of the chart headers in FIGS. 4A through 4C may be highlighted, colored, bolded or otherwise differently formatted conditionally based on the performance indicated by one or more of the KPIs which the chart shows or the chart is based on. In one example embodiment, a different color header may indicate a different performance level indicated by the displayed KPI value or values. For example, the "Session DRB Success Rate (%)" header 406 may be a certain color (e.g., green instead of red) to indicate a particular performance level indicated by the DRB establishment success rate for chart 404. The chart 404 may also display the KPI data (e.g., the DRB establishment success rate) for the previous day 408.

Also, in an example embodiment, a selectable "drill down" GUI element may be displayed for each of the charts 404, 422, 442. In response to the system receiving an indication of selection of the selectable "drill down" graphical user interface, the system displays a list of a plurality of top network elements (e.g., cell towers) contributing to the corresponding performance levels of the KPI over time showing on the particular chart. In the example shown in FIG. 4A, in response to a user selecting the "drill down" element 410 displayed next to or conjunction with DRB establishment success rate chart 404, the system 100 may pop-up or otherwise display a list the top network elements contributing to the corresponding DRB establishment success rate levels shown in chart 404. An example of such a "drill down" list 448 for the random-access channel (RACH) access success rate chart 442 is shown in FIG. 4C.

The example radio resource control (RRC) protocol data unit (PDU) setup success rate chart 422 shown in FIG. 4B is a combined line and bar chart with the lines graphically illustrating the RRC and PDU session establishment success rate percentages over time for the selected AOI RAN report for the LAS market. Also shown on the chart 422 are bars graphically illustrating numbers of RRC attempts on the same chart over the same timeframe. The vertical axis on the right hand side of the chart 422 indicates the number of RRC attempts in the thousands while the vertical axis on the left hand side of the chart 422 indicates the setup success rate percentage. In an example embodiment, the "RRC PDU Success Rate (%)" header 424 may be conditionally formatted to indicate a particular performance level indicated by the RRC and PDU session establishment success rate for chart 422. The chart 422 may also display the KPI data (e.g., the RRC or PDU establishment success rate) for the previous day 426.

In the example shown in FIG. 4B, in response to a user selecting the "drill down" element 428 displayed next to or conjunction with the RRC and PDU session establishment success rate chart 422, the system 100 may pop-up or otherwise display a list the top network elements contributing to the corresponding RRC and PDU session establishment success rate performance levels shown in chart 422.

The example RACH access success rate chart 442 shown in FIG. 4C is a combined line and bar chart with the line graphically illustrating RACH access success rate percentages over time for the selected AOI RAN report for the LAS market. Also shown on the chart 442 are bars graphically illustrating RACH transaction numbers on the same chart over the same timeframe. The vertical axis on the right hand side (not shown) of chart 442 indicates the number of RACH transactions while the vertical axis on the left hand side of the chart 442 indicates the access success rate percentage. In an example embodiment, the "RACH Access Success Rate (%)" header 444 may be conditionally formatted to indicate a particular performance level indicated by the RACH access success rate for chart 442. The chart 442 may also display the KPI data (e.g., the RACH access success rate) for the previous day 458.

In the example shown in FIG. 4C, in response to a user selecting the selectable "drill down" element 446 displayed next to or conjunction with the RACH access success rate chart 442, the system 100 may pop-up or otherwise display the "drill down" list 448 for the RACH access success rate chart 442 listing the top network elements 450 contributing to the corresponding RACH access success rate performance levels shown in chart 442. In the present example, the "drill down" list 448 displays identifiers for (e.g., using the NR Cell Global Identifier (NRCGI)) or otherwise indicates the top cell towers contributing to the corresponding RACH access success rate performance levels shown in chart 442, as well as their respective voice accessibility KPI percentages 452 and KPI values 454. Also displayed on the "drill down" list 448 is an interactive user interface element 456 (e.g., a button) selectable to close the "drill down" list 448. The number of top network elements to be displayed in the "drill down" list 448 may be vary in different embodiments and may also be customized or selectable by the user in various embodiments. Each network element appearing in the "drill down" list 448 may also be selectable to access additional information about the selected network element, such as, for example, the information displayed in the object information list 600 of FIG. 6.

FIG. 5 is an example GUI of a mapping screen 500 displaying an example geographical map 510 of network elements based on one or more of a plurality of KPIs in response to a user selecting a custom report in accordance with embodiments described herein.

For example, the geographical map 510 is displayed based on the user selecting the AOI RAN type of report shown by the AOI RAN indicator 318 and a filter indicating a particular market, shown by the LAS indicator 318 designating a particular portion of the wireless services network. Thus, in response to the user have made such selections and then selecting the "Map" selectable user interface element 304, the interactive geographical map 510 is displayed based on the applicable KPIs in the selected AOI RAN report for the LAS market. The user may indicate various filters or other criteria for what information is displayed on the interactive geographical map 510. For example, the user may select the specific KPI, device criteria (e.g., signal-to-noise ratio (SINR)) and market by selecting such options from a corresponding KPI selection drop down menu 502, a device criteria selection drop down menu 504 and a market selection drop down menu 506 displayed next to or in conjunction with the map 510 and then selecting an "update map" GUI element 508. In response to the "update map" GUI element 508 being selected, the interactive geographical map 510 will be updated to display network elements and data, such as cell towers and location-based data based on the criteria selected. In an example embodiment, the cell towers in the selected market are displayed in their respective geographical locations, are sized based on band, and are color-coded based on performance indicated by the selected KPI. Thus, in the present example, the cell towers in the LAS market are displayed in their respective geographical locations on map 510, are sized based on band, and are color-coded based on performance indicated by the Voice over New Radio (VoNR) session drop rate KPI selected in the KPI drop down menu 502. For example, the interactive graphical GUI element 512 represents a cell tower in the LAS market is displayed in its respective geographic location on the map 510, is sized based on band and is color-coded based on performance indicated by the Voice over New Radio (VoNR) session drop rate KPI selected in the KPI drop down menu 502.

Also, interactive dots are displayed on the map 510 that indicate location-based data, such as a geographic location of a network event or anomaly. For example, interactive dot 514 is displayed on the map 510 indicating a geographic location of a network event or anomaly. Objects displayed on the map, such as interactive graphical GUI element 512 and interactive dot 514 may be selected to view in real-time additional updated data regarding the object. For example, selection of the interactive graphical GUI element 512 representing particular cell tower or cell in the LAS market on map 510 may cause the object information list 600 shown in FIG. 6 to pop up on the mapping screen 500.

Figure 6:
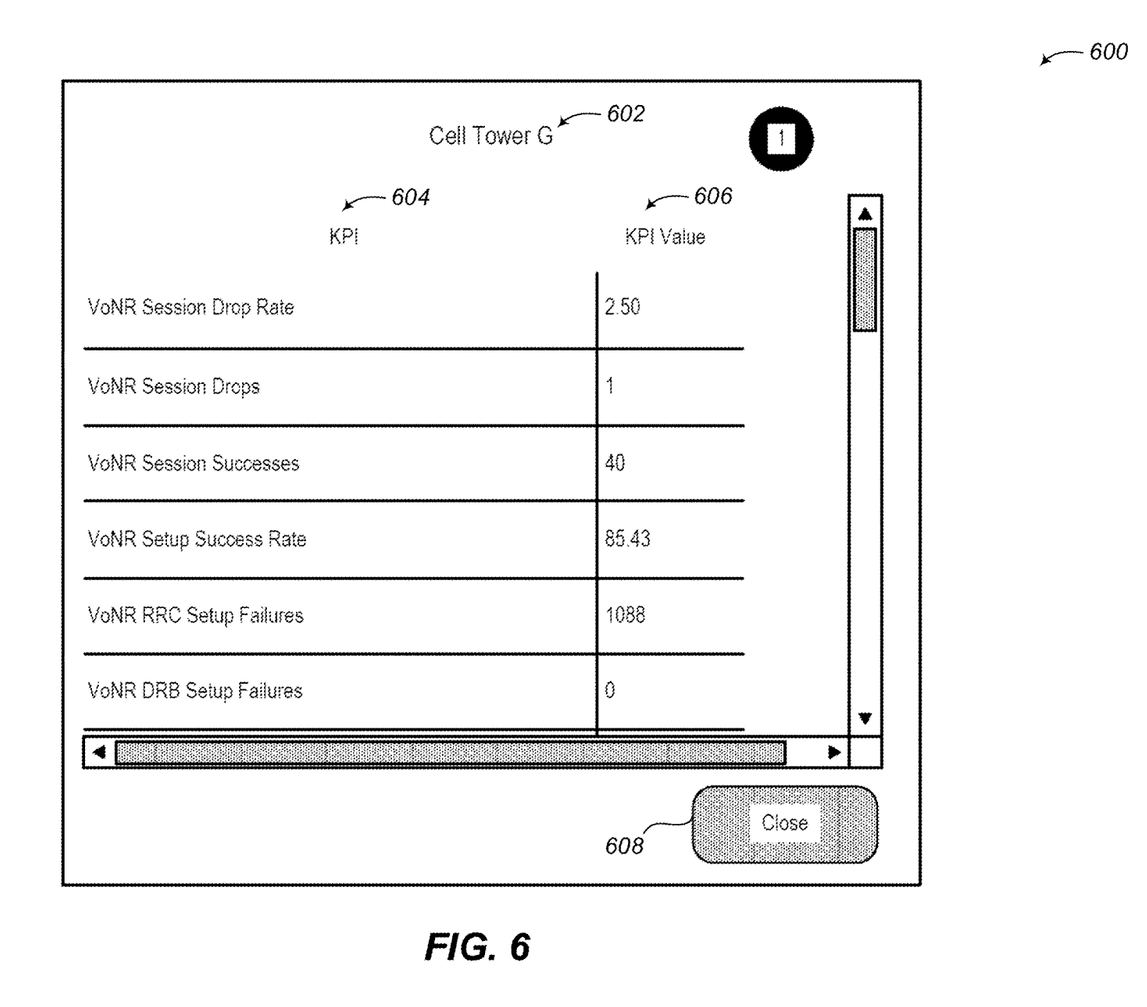
FIG. 6 is an example GUI of an object information list displaying additional information about a selected network object in accordance with embodiments described herein.

FIG. 6 is an example GUI of the object information list 600 displaying additional information about a selected network object in accordance with embodiments described herein. For example, selection of the interactive graphical GUI element 512 representing particular cell tower or cell in the LAS market on map 510 in FIG. 5 may cause the object information list 600 shown in FIG. 6 to pop up on the mapping screen 500. In the present example, interactive graphical GUI element 512 represents cell tower G. The object information list 600 lists various KPI data for the selected cell tower G based on the VoNR session drop rate KPI selected in the KPI drop down menu 502 of FIG. 5. In particular listed are the applicable KPIs 604 and the respective KPI values 606 associated with selected cell tower G relevant to the VoNR session drop rate KPI selected in the KPI drop down menu 502 of FIG. 5. Also displayed on the object information list 600 is an interactive user interface element 608 (e.g., a button) selectable to close the object information list 600.

In various embodiments, alarms based on KPI performance levels, open service tickets and ticket history, open work orders and work order history, open customer tickets and customer ticket history and/or other network data may be displayed on the map 510 and/or in a table based on report filters and criteria selected utilizing the interactive GUI elements shown in FIGS. 2 through 6. Parameter configurations and configuration issues may also be displayed in a table or otherwise in one or more GUI screens based on report filters and criteria selected utilizing the interactive GUI elements shown in FIGS. 2 through 6.

Figure 7:
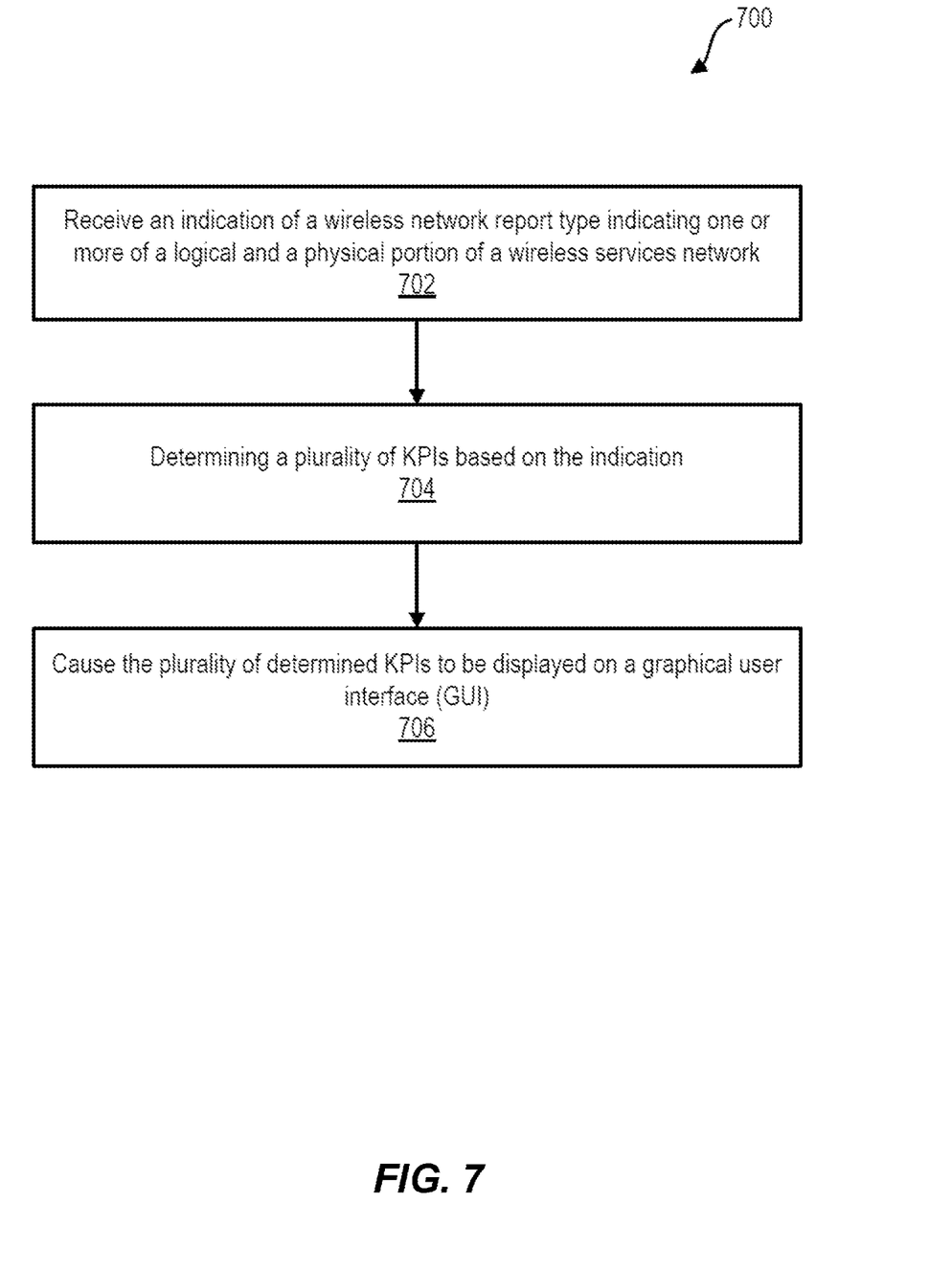
FIG. 7 illustrates a logical flow diagram showing an example embodiment of a process involving a KPI user interface for a wireless services network in accordance with embodiments described herein.

FIG. 7 illustrates a logical flow diagram showing an example embodiment of a process 700 involving a KPI user interface for a wireless services network in accordance with embodiments described herein.

At 702 the system 100 electronically receives an indication of a wireless network report type indicating one or more of a logical and a physical portion of a wireless services network.

At 702 the system 100, in response to electronically receiving the indication of the wireless network report type indicating one or more of a logical and physical portion of the wireless services network, determines a plurality of KPIs of the indicated one or more of a logical and physical portion of the wireless services network based on the indication. The plurality of determined KPIs may include, but is not limited to: a radio access network (RAN) availability percentage for the indicated one or more of a logical and physical portion of the wireless services network; a voice accessibility percentage for the indicated one or more of a logical and physical portion of the wireless services network; a data accessibility percentage for the indicated one or more of a logical and physical portion of the wireless services network; an average user equipment (UE) downlink (DL) throughput value for the indicated one or more of a logical and physical portion of the wireless services network; a voice retainability percentage for the indicated one or more of a logical and physical portion of the wireless services network; and a data retainability percentage for the indicated one or more of a logical and physical portion of the wireless services network.

At 702 the system 100, causes the plurality of determined KPIs to be displayed on a GUI. In some embodiments, this may include visually formatting display of each of the plurality of determined KPIs based on performance levels of each of the plurality of determined KPIs. For example, visually formatting display of each of the plurality of determined KPIs may include causing to be displayed on the GUI different colors associated with different corresponding performance levels of each of the plurality of determined KPIs.

Figure 8:
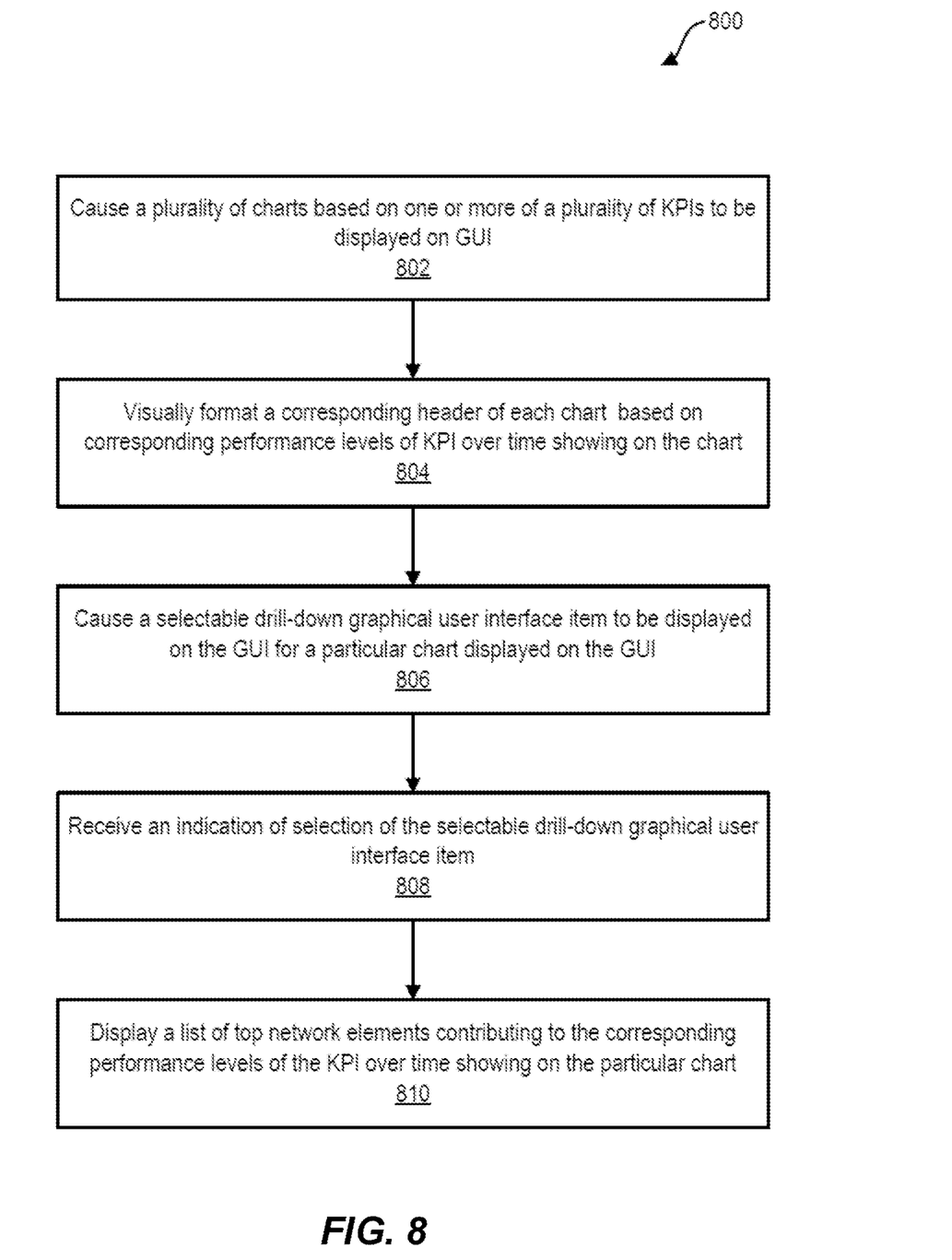
FIG. 8 illustrates a logical flow diagram showing an example embodiment of a process for charting and mapping visualization of KPIs of a wireless telecommunication network in accordance with embodiments described herein.

FIG. 8 illustrates a logical flow diagram showing an example embodiment of a process 800 for charting and mapping visualization of KPIs of a wireless telecommunication network in accordance with embodiments described herein.

At 802, the system 100 causes a plurality of charts based on one or more of a plurality of KPIs to be displayed on a GUI. As one example, in response to electronically receiving the indication of the wireless network report type indicating one or more of a logical and physical portion of the wireless services network, the system may determine a session data radio bearer (DRB) establishment success rate percentage over time for each of voice and data for the indicated one or more of a logical and physical portion of the wireless services network based on the indication. The system 100 may then cause a chart to be displayed of the DRB establishment success rate percentage over time for each of voice and data. The system may also cause numbers of RRC attempts over time to be displayed on the same chart.

At 804, the system 100 visually formats a corresponding header of each chart of the plurality of charts based on corresponding performance levels of at least one determined KPI over time showing on the chart.

At 806, the system 100 causes a selectable drill down graphical user interface item to be displayed on the GUI for a particular chart displayed on the GUI At 808, the system 100 receives an indication of selection of the selectable drill down graphical user interface item.

At 810, the system 100, in response to receiving the indication of selection, displays a list of a plurality of top network elements contributing to the corresponding performance levels of the at least one determined KPI over time showing on the particular chart. For example, the list of the plurality of top network elements contributing to the corresponding performance levels may be a list of the top cellular towers contributing the most to the corresponding performance levels.

Figure 9:
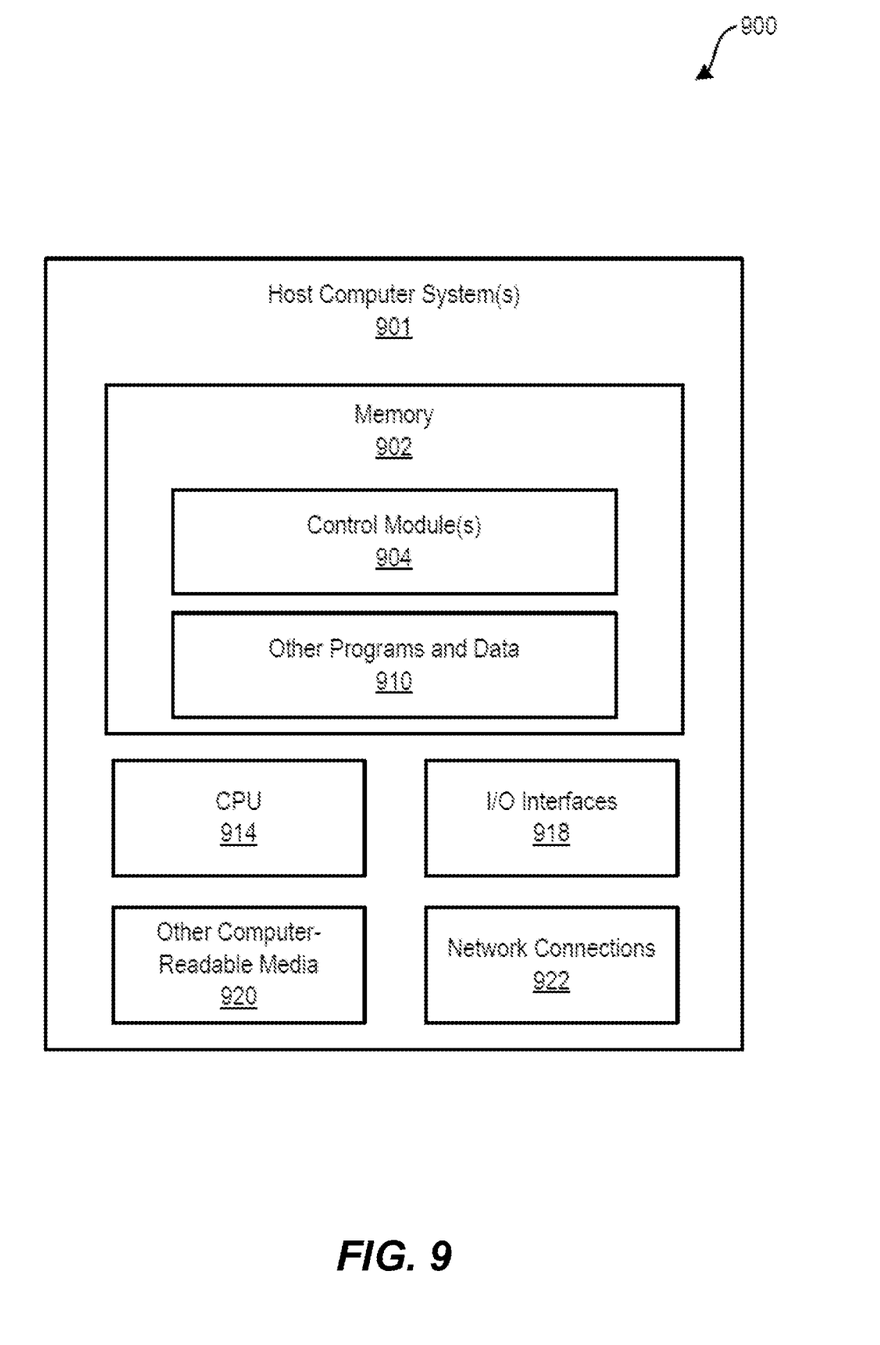
FIG. 9 shows a system diagram that describes an example implementation of computing system(s) for implementing embodiments described herein.

FIG. 9 shows a system diagram that describes an example implementation of computing system(s) 900 for implementing embodiments described herein.

The functionality described herein for charting and mapping visualization of KPIs of a wireless telecommunication network can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 9 illustrates an example of underlying hardware on which such software and functionality may be hosted and/or implemented. For example, computer system(s) 901 may represent example components of underlying computer hardware for some or all of the components shown in FIG. 1 and for some or all of the components that generate and cause display of the GUI features of FIGS. 2-6.

In particular, shown is example host computer system(s) 901. For example, such computer system(s) 901 may represent one or more of those in various data centers, control centers, base stations and cell sites and/or other components that are, or that host or implement the functions of: routers, components, microservices, APIs, nodes, node groups, control planes, clusters, virtual machines, NFs, and other aspects described herein for charting and mapping visualization of KPIs of a wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems, components and modules described herein for charting and mapping visualization of KPIs of a wireless telecommunication network. Memory 902 may also store other programs and data 910, which may include rules, databases, application programming interfaces (APIs), microservices, SaaS platforms, software containers, nodes, pods, clusters, node groups, control planes, software defined data centers (SDDCs), microservices, virtualized environments, software platforms, cloud computing service software, network management software, network orchestrator software, orchestration layer software, security software, network functions (NF), artificial intelligence (AI) or machine learning (ML) programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interfaces, other data input or output interfaces, or the like. Other computer-readable media 920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method involving a user interface for a wireless services network, the method comprising:
   electronically receiving an indication of a wireless network report type indicating one or more of a logical and a physical portion of a wireless services network;
   in response to electronically receiving the indication of the wireless network report type indicating one or more of a logical and physical portion of the wireless services network, determining one or more of time data and location data related to the indicated one or more of a logical and physical portion of the wireless services network based on the indication;

causing the one or more of time data and location data to be displayed on a graphical user interface (GUI), wherein the determined one or more of time data and location data includes a plurality of key performance indicators (KPIs) related to the indicated one or more of a logical and physical portion of the wireless services network;

causing a plurality of charts based on one or more of the plurality of KPIs to be displayed on the GUI; and visually formatting a corresponding header of each chart of the plurality of charts based on corresponding performance levels of at least one KPI over time showing on the chart.

2. The method of claim 1, wherein the causing the plurality of charts to be displayed on the GUI includes:

in response to electronically receiving the indication of the wireless network report type indicating one or more of a logical and physical portion of the wireless services network, determining a session data radio bearer (DRB) establishment success rate percentage over time for each of voice and data for the indicated one or more of a logical and physical portion of the wireless services network based on the indication;

causing a chart to be displayed of the DRB establishment success rate percentage over time for each of voice and data; and causing numbers of radio resource control (RRC) attempts over time to be displayed on the same chart.

3. The method of claim 1, further comprising:

causing a selectable drill down graphical user interface item to be displayed on the GUI for a particular chart displayed on the GUI;

receiving an indication of selection of the selectable drill down graphical user interface item; and in response to receiving the indication of selection, displaying a list of a plurality of top network elements contributing to the corresponding performance levels of the at least one KPI over time showing on the particular chart.

4. The method of claim 3 wherein the list of the plurality of top network elements contributing to the corresponding performance levels is a list of top cellular towers contributing to the corresponding performance levels.

5. A system for visualization of key performance indicators (KPIs), the system comprising:

at least one memory that stores computer executable instructions; and at least one processor that executes the computer executable instructions to cause actions to be performed, the actions including:

electronically receiving an indication of a wireless network report type indicating one or more of a logical and a physical portion of a wireless services network;

in response to electronically receiving the indication of the wireless network report type indicating one or more of a logical and physical portion of the wireless services network, determining one or more of time data and location data related to the indicated one or more of a logical and physical portion of the wireless services network based on the indication;

causing the one or more of time data and location data to be displayed on a graphical user interface (GUI), wherein the determined one or more of time data and location data includes a plurality of key performance indicators (KPIs) related to the indicated one or more of a logical and physical portion of the wireless services network;

causing a plurality of charts based on one or more of the plurality of KPIs to be displayed on the GUI; and visually formatting a corresponding header of each chart of the plurality of charts based on corresponding performance levels of at least one KPI over time showing on the chart.

6. The system of claim 5, wherein the causing the plurality of charts to be displayed on the GUI includes:

in response to electronically receiving the indication of the wireless network report type indicating one or more of a logical and physical portion of the wireless services network, determining a session data radio bearer (DRB) establishment success rate percentage over time for each of voice and data for the indicated one or more of a logical and physical portion of the wireless services network based on the indication;

causing a chart to be displayed of the DRB establishment success rate percentage over time for each of voice and data; and causing numbers of radio resource control (RRC) attempts over time to be displayed on the same chart.

7. The system of claim 5, wherein the actions further include:

causing a selectable drill down graphical user interface item to be displayed on the GUI for a particular chart displayed on the GUI;

receiving an indication of selection of the selectable drill down graphical user interface item; and in response to receiving the indication of selection, displaying a list of a plurality of top network elements contributing to the corresponding performance levels of the at least one KPI over time showing on the particular chart.

8. The system of claim 7 wherein the list of the plurality of top network elements contributing to the corresponding performance levels is a list of top cellular towers contributing to the corresponding performance levels.

* * * * *